United States Patent
Imming et al.

(10) Patent No.: US 8,600,059 B2
(45) Date of Patent: *Dec. 3, 2013

(54) SHORT MESSAGE SERVICE CIPHER

(75) Inventors: Philip C. Imming, Coronado, CA (US);
Krijn van der Raadt, San Diego, CA (US)

(73) Assignee: GreatCall, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/276,225

(22) Filed: Oct. 18, 2011

(65) Prior Publication Data

US 2012/0033814 A1 Feb. 9, 2012

Related U.S. Application Data (63) Continuation of application No. 13/149,612, filed on May 31, 2011.

(60) Provisional application No. 61/350,360, filed on Jun. 1, 2010.

(51) Int. Cl.
*H04L 29/06* (2006.01)

(52) U.S. Cl.
USPC ............................... 380/270; 380/240

(58) Field of Classification Search
USPC .................................. 380/247, 270
See application file for complete search history.

(56) References Cited

U.S. PATENT DOCUMENTS

| | | | |
|---|---|---|---|
| 5,664,017 A | 9/1997 | Gressel et al. | |
| 5,909,491 A | 6/1999 | Luo | |
| 6,097,961 A | 8/2000 | Alanara et al. | |
| 6,185,417 B1 | 2/2001 | Pyorala | |
| 6,324,287 B1 * | 11/2001 | Angert | 380/43 |
| 6,480,096 B1 * | 11/2002 | Gutman et al. | 340/5.31 |
| 6,498,936 B1 | 12/2002 | Raith | |
| 7,076,657 B2 | 7/2006 | Koukoulidis et al. | |
| 7,366,842 B1 * | 4/2008 | Acocella et al. | 711/118 |
| 7,424,302 B2 | 9/2008 | Carpenter | |
| 7,546,118 B2 | 6/2009 | Camp, Jr. | |
| 7,548,757 B2 | 6/2009 | Major | |
| 7,565,546 B2 | 7/2009 | Candelore | |
| 7,603,112 B2 | 10/2009 | Huomo et al. | |
| 7,694,128 B2 | 4/2010 | Judge et al. | |
| 8,050,405 B2 | 11/2011 | Camp et al. | |

(Continued)

FOREIGN PATENT DOCUMENTS

WO 2005/104422 A1 11/2005

OTHER PUBLICATIONS

"One Time Pad" from http://users.telenet.be/d.rijmenants/en/onetimepad.htm. pp. 1-12. Retrieved Mar. 23, 2012.*

*Primary Examiner* — Lisa Lewis
(74) *Attorney, Agent, or Firm* — Kilpatrick Townsend & Stockton LLP (57) ABSTRACT

A wireless phone system and methods performed thereon for cryptographically processing SMS messages is disclosed. A cryptographic pad is used to replace characters in a payload of a SMS message with coded characters. The cryptographic pad is used by the receiver of the SMS message to decode it. The cryptographic pad is one of two or more possible cryptographic pads stored in the receiver. In one embodiment, the two or more possible cryptographic pads are sent as a key where a particular cryptographic pad is referenced in the key using an index.

40 Claims, 4 Drawing Sheets

(56) References Cited

U.S. PATENT DOCUMENTS

| | | |
|---|---|---|
| 2002/0035687 A1 | 3/2002 | Skantze |
| 2002/0131598 A1 | 9/2002 | Chiu |
| 2002/0177454 A1 | 11/2002 | Karri et al. |
| 2002/0191795 A1 | 12/2002 | Wills |
| 2003/0026429 A1* | 2/2003 | Hammersmith ............... 380/277 |
| 2003/0044016 A1 | 3/2003 | Nocham et al. |
| 2003/0072450 A1 | 4/2003 | Maggenti |
| 2003/0078058 A1 | 4/2003 | Vatanen et al. |
| 2004/0034693 A1* | 2/2004 | Agarwal ....................... 709/206 |
| 2004/0106418 A1 | 6/2004 | Cini et al. |
| 2004/0117623 A1 | 6/2004 | Kalogridis et al. |
| 2004/0142709 A1 | 7/2004 | Coskun et al. |
| 2004/0203957 A1 | 10/2004 | George |
| 2004/0235503 A1 | 11/2004 | Koponen et al. |
| 2005/0031124 A1 | 2/2005 | Jain et al. |
| 2005/0048971 A1 | 3/2005 | Findikli et al. |
| 2005/0114664 A1 | 5/2005 | Davin |
| 2005/0135622 A1 | 6/2005 | Fors et al. |
| 2005/0226420 A1 | 10/2005 | Makela et al. |
| 2005/0232422 A1 | 10/2005 | Lin et al. |
| 2006/0177065 A1* | 8/2006 | Halbert ........................ 380/277 |
| 2006/0204011 A1 | 9/2006 | Adams et al. |
| 2006/0234731 A1 | 10/2006 | Taylor et al. |
| 2007/0073627 A1* | 3/2007 | Richards ........................ 705/59 |
| 2007/0074276 A1* | 3/2007 | Harrison et al. ................... 726/4 |
| 2007/0087765 A1 | 4/2007 | Richardson et al. |
| 2007/0172066 A1 | 7/2007 | Davin |
| 2007/0258584 A1 | 11/2007 | Brown et al. |
| 2008/0005024 A1 | 1/2008 | Kirkwood |
| 2008/0031459 A1 | 2/2008 | Voltz et al. |
| 2008/0085728 A1 | 4/2008 | Reding et al. |
| 2008/0089519 A1 | 4/2008 | Ekberg |
| 2008/0170689 A1 | 7/2008 | Boubion et al. |
| 2008/0208886 A1* | 8/2008 | Zhang ........................... 707/102 |
| 2008/0268882 A1 | 10/2008 | Moloney |
| 2008/0300000 A1 | 12/2008 | Carpenter |
| 2008/0311935 A1 | 12/2008 | Tysowski |
| 2009/0060198 A1 | 3/2009 | Little |
| 2009/0061912 A1 | 3/2009 | Brown et al. |
| 2009/0143087 A1 | 6/2009 | Minborg et al. |
| 2009/0185677 A1* | 7/2009 | Bugbee ........................... 380/28 |
| 2009/0198997 A1 | 8/2009 | Yeap et al. |
| 2009/0215476 A1 | 8/2009 | Tysowski |
| 2009/0227274 A1 | 9/2009 | Adler et al. |
| 2009/0239557 A1 | 9/2009 | Kadakia et al. |
| 2009/0265552 A1 | 10/2009 | Moshir et al. |
| 2009/0325615 A1 | 12/2009 | McKay et al. |
| 2010/0020972 A1 | 1/2010 | Baugher et al. |
| 2010/0041424 A1 | 2/2010 | Osborn |
| 2010/0069097 A1 | 3/2010 | Chin et al. |
| 2010/0087212 A1 | 4/2010 | Shi et al. |
| 2010/0159962 A1 | 6/2010 | Cai et al. |
| 2010/0248757 A1* | 9/2010 | Baek ............................. 455/466 |
| 2010/0298014 A1 | 11/2010 | Kamphuis |
| 2011/0039587 A1 | 2/2011 | Madhavan et al. |
| 2011/0055546 A1 | 3/2011 | Klassen et al. |

* cited by examiner

SHORT MESSAGE SERVICE CIPHER

This application is a continuation of pending U.S. patent application Ser. No. 13/149,612 filed on May 31, 2011 which claims the benefit of and is a non-provisional of U.S. Provisional Application Ser. No. 61/350,360 filed on Jun. 1, 2010, which are hereby expressly incorporated by reference in their entirety for all purposes.

BACKGROUND

This disclosure relates in general to short message service (SMS) and, but not by way of limitation, to encryption of SMS.

SMS is used to pass private messages and control messages. Some cellular phones systems encrypt all communication between the base station and mobile handsets. This encryption has been hacked on some phone systems and does not provide adequate security for some situations. Control messages sent over SMS can be particularly sensitive. Phone features, personal information, keys, etc. can be sent in control messages.

SMS messages are very small being generally limited to 1120 bits and use a variety of character sets. There are 160 characters in a SMS message for 7 bit character sets and 140 characters for an 8 bit character set. Encrypting small messages with keys that can often be larger than the SMS, produces weak protection and high overhead. Many of the available characters in the SMS message are lost in support of conventional encryption.

SUMMARY

In one embodiment, the present disclosure provides a wireless phone system and methods performed thereon for cryptographically processing SMS messages. A cryptographic pad is used to replace characters in a payload of a SMS message with coded characters. The cryptographic pad is used by the receiver of the SMS message to decode it. The cryptographic pad is one of two or more possible cryptographic pads stored in the receiver. In one embodiment, the two or more possible cryptographic pads are sent as a key where a particular cryptographic pad is referenced in the key using an index.

In another embodiment, a cellular telephone encryption system for protecting messages for a handset is disclosed. The cellular telephone encryption system includes a key, an index, a cryptographic algorithm, and a wireless transceiver. The key is larger than the messages, where the key is arranged in a circular buffer. The index indicates a reference point for a cryptographic pad, which is a subset of the key. The cryptographic algorithm cryptographically processes a message as a function of the cryptographic pad. The wireless transceiver that sends or receives the message.

In yet another embodiment, a method for cryptographically processing short message service (SMS) messages of a handset is disclosed. After loading a key, an index within the key is determined. As a function of a cryptographic pad located by the index, a replacement character is determined. A character in the payload of the SMS message is replaced with the replacement character.

In still another embodiment, a method for cryptographically processing short message service (SMS) messages of a handset. A value that identifies a cryptographic pad is provided from a plurality of cryptographic pads that are use to cryptographically process a SMS message. The chosen cryptographic pad is loaded. A replacement character, that is a function of the cryptographic pad identified by the value, is determined. A character in the payload of the SMS message is replaced with the replacement character.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Where the reference label is used in the specification, the description is applicable to any one of the similar components having the same reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

In one embodiment, the present disclosure provides the ability to pass encrypted XML, or other printable characters, between the handset and a server in a wireless phone system. The short message service (SMS) message length is 170 characters or less. The SMS uses Binary Runtime Environment for Wireless (BREW®) directed SMS, which uses 16 characters for its message header. This leaves only 144 characters for the payload to pass useful information to or from the handset. The BREW® implementation of standard encryption schemes like AES and TripleDES requires conversion to base64 and a trailing empty block, which leaves only 89 bytes for useful information for the payload in each SMS message. Other embodiments need not use the same protocol as BREW®.

Rather than use a binary, block oriented encryption scheme, a stream cipher is used: each printable character is encrypted by converting it to some other printable character. There are 95 printable characters—ASCII 32 (i.e., space) through ASCII 126 (i.e., tilde) used as possible characters in the SMS payload, but other embodiments could use 64 or 128 characters. Another embodiment uses the GSM default alphabet which is a 7-bit character set defined in the ETSI GSM Phase 2+ Technical Specification 03.38. Each handset has its own binary key between 256 and 4096 bytes, but other embodiments could have keys of any size (e.g., 1, 8, 16, 64, 128, 256, 512, 1024, 2048, 4096, 8192, 16384 bytes, or any power of 2 or other integer). Some embodiments could have different sized binary keys for different handsets in the wireless communication system. The binary key is unique for each handset in one embodiment. In some embodiments, groups of handsets may have the same binary key. The binary key is sent to the handset at provisioning and updated via hypertext transfer protocol secure (HTTPS) or some other encrypted channel. Other embodiments could update the binary key using private or public key cryptography. The binary key can be updated when the handset in the field has been corrupted or compromised. Some embodiments change out the binary key periodically. The binary key includes random or pseudorandom values generated by a key generation server in the network controller or elsewhere in the wireless phone system.

The encryption algorithm itself is stored on the handset and therefore available to anyone who buys a phone and is able to break in and read its embedded software. Security lies in the uniqueness of the binary key for each handset or group of handsets. Different handsets in the wireless phone system can have keys of different lengths. The binary key is protected on the handset and inaccessible to the user. Where tampering of the handset is detected, the binary key can be erased and/or updated. The embedded software and/or state machines implementing the encryption algorithm can be secure and/or tamper resistant. The binary key can be held in memory in encrypted form only being decrypted prior to use in crypto-processing of SMS messages. The encryption algorithm can be implemented in software and/or hardware. One embodiment holds the cryptoalgorithm and binary key in the same semiconductor chip where the binary key and is not accessible outside the semiconductor chip in unencrypted form.

In one embodiment, the 95 member character set is arranged in a circular list. Distances may be greater than 95 and rotate a number of times through the circular list before finding the replacement character. The circular list may be sequentially, randomly or pseudorandomly arranged with both server and handset knowing the arrangement in the circular list. To encrypt a SMS message, each character in the plaintext message is replaced with the character that is some computed distance forward in the circular list. To decrypt a message, run through each character in the encrypted message and replace it with the character that is the same computed distance backward in the circular list.

The binary key is an array of bytes, which are random or pseudorandom values between 0 and 255, but other embodiments could use larger or smaller values for each group of bits arranged in the array. The binary key is generated away from the handset in the wireless phone system and is known to the handset and a crypto controller to allow cryptographic communications between them. Other embodiments could use public keying to create the binary key.

In order to use the random data in the binary key in a first embodiment, the distance computation between characters in the circular list includes multiple hops through the key data, using the key value at each hop as input into the next hop distance. Except for the first character, the distance computation will also take the previous characters distance as input. Some embodiments do not use previous distance calculations in distance computations.

In order to vary the first characters distance computation, two random characters are generated at encryption time and put, in plaintext, at the front of the SMS message by the handset or server sending the SMS message. These two values (a and b) and the length of the message (c) are used to compute a set of nine offsets: $a*b+a$, $a*b+b$, $a*b+c$, $a*c+a$, $a*c+b$, $a*c+c$, $b*c+a$, $b*c+b$, $b*c+c$. Another embodiment mixes the offset equations randomly or pseudo randomly for different handsets. This helps make references to the binary key that are spread across its entire length.

The distance computation starts in a first embodiment with the previous character distance (zero for the first character) and loops though the 9 offsets using the sum of the offset and the key value at the previous hop as an index into the key.

EXAMPLE 1

Given the following 256 byte binary key (expressed in base64 hex):

331BCEC5C8BA65EDB1070143771CD947F0D5ED3-B67CB28A7F38BF0741E5D7C3791CEE9704C99A-E042D10EA6003B9797C25F5AEFDA703E268F327-D23DCAF1CF548BC9B2A93368FB5626E90E56E1-C8A33911734F29AE7E8F8EEB817C25C770393C4-195D43A07D048BCFA57D7BDF48C862B84982C5-6A1A6A50C3923BDB2EBD68FB5AFD2154BF369-32402B922E56A7D2995FFA51A02E44E39A9BF0C-800E31396D024C8210D22773A381A65EC2B0F77-4E64678A5DB79A356071CC37795B2A684F2C94-C10A8E86C476E8BF1986C958B88B23A1639859-B6DE36EF68AF41EAFDDF0DB216BF964D6DC0-DEA31375F8 81AF971913AC55B9C6CFF576B68B-1A26D6828BEAE00B

The message "Hello World" is encrypted in this example. Two random numbers (0-95) are generated for a particular SMS message, in this case, 48 and 9 and stored as printable characters (add 32 to shift) at the front of the output message as the characters 'P' and ')'. The random numbers designate characters by choosing the character located that deep into the circular list of the binary key. The nine offsets are calculated using a=48, b=9, and c=11 (the length of the message): 224, 185, 187, 64, 25, 27, 147, 108, and 110.

Using 0 as the initial distance and looping though the nine offsets:

19=224+key[0](51) mod 256
224=185+key[19](59) mod 256
176=187+key[224](191) mod 256
202=64+key[176](138) mod 256
226=25+key[202](201) mod 256
104=27+key[226](77) mod 256
141=147+key[104](250) mod 256
62=108+key[141](210) mod 256
61=110+key[62](207) mod 256 using the value of the character to be encrypted, 'H', 72
116=(72−32+key[61](241) mod 94+32

The encrypted character for the first character, 'H', is 't' in this example.

Using 61 as the initial distance, the offsets are looped through to compute 83 as the next characters offset, so 'o' is encrypted to 'S' in this example.

This process is repeated for each character in the message resulting in the final encryption for "Hello World" being: "P)tSF'8JH6[tR".

Decryption is simply using the first two characters as the a and b for calculating the offsets and going through the same process only in the final step subtracting rather than adding the offset.

In order to use all of the random data in the binary key in a second embodiment, the distance computation between characters in the circular list includes multiple hops through the key data, using the key value at each hop as input into the next hop distance as well as an block offset based on the message length to insure the entire key is utilized. Except for the first character, the distance computation will also take the previous characters distance as input. Some embodiments do not use previous distance calculations in distance computations.

In order to vary the first characters distance computation, two random characters are generated at encryption time and put, in plaintext, at the front of the SMS message by the handset or server sending the SMS message. These two values (a and b) and the length of the message (c) are used to compute a set of nine offsets: a*b+a, a*b+b, a*b+c, a*c+a, a*c+b, a*c+c, b*c+a, b*c+b, b*c+c. Another embodiment mixes the offset equations randomly or pseudo randomly for different handsets. This helps make references to the binary key that are spread across its entire length.

To insure that the entire key is utilized in the second embodiment, a block offset is calculated equal to the length of the key divided by the length of the message.

In the second embodiment, the distance computation starts with the previous character distance (zero for the first character) and loops though the 9 offsets using the sum of the offset and the key value at the previous hop as an index into the key.

EXAMPLE 2

Given the following 256 byte binary key (expressed in base64 hex):
331BCEC5C8BA65EDB1070143771CD947F0D5ED3-
B67CB28A7F38BF0741E5D7C3791CEE9704C99-
AE042D10EA6003B9797C25F5AEFDA703E268F-
327D23DCAF1CF548BC9B2A93368FB5626E90E-
56E1C8A33911734F29AE7E8F8EEB817C25C7703-
93C4195D43A07D048BCFA57D7BDF48C862B849-
82C56A1A6A50C3923BDB2EBD68FB5AFD2154-
BF36932402B922E56A7D2995FFA51A02E44E39A-
9BF0C800E31396D024C8210D22773A381A65EC2-
B0F774E64678A5DB79A356071CC37795B2A684F-
2C94C10A8E86C476E8BF1986C958B88B23A1639-
859B6DE36EF68AF41EAFDDF0DB216BF964D6D-
C0DEA31375F881AF971913AC55B9C6CFF576B6-
8B1A26D6828BEAE00B The message "Hello World" is encrypted in this example. Two random numbers (0-95) are generated for a particular SMS message, in this case, 48 and 9 and stored as printable characters (add 32 to shift) at the front of the output message as the characters 'P' and ')'. The random numbers designate characters by choosing the character located that deep into the circular list of the binary key. The nine offsets are calculated using a=48, b=9, and c=11 (the length of the message): 224, 185, 187, 64, 25, 27, 147, 108, and 110. The block offset=256/11=23 (rounded down to the nearest integer).

Using 0 as the initial distance and looping though the nine offsets:
19=224+key[0](51) mod 256
224=185+key[19](59) mod 256
176=187+key[224](191) mod 256
202=64+key[176](138) mod 256
226=25+key[202](201) mod 256
104=27+key[226](77) mod 256
141=147+key[104](250) mod 256
62=108+key[141](210) mod 256
61=110+key[62](207) mod 256

At this point, the block offset is used to insure the entire key is referenced. A multiple of the block offset is added the multiple is the position of the character in the message minus one. In this example, for the first character, zero is added, for the second character 23 is added, for the third character, 46 is added, and so forth.

using the value of the character to be encrypted, 'H', 72
116=(72−32+key[61](241) mod 95+32

The encrypted character for the first character, 'H', is 't' in this example.

Using 116 as the initial distance, the offsets are looped through to compute 57 as the next characters offset, so 'o' is encrypted to '9' in this example.

This process is repeated for each character in the message resulting in the final encryption for "Hello World" being: "P)t9][iR*|93)".

Decryption is simply using the first two characters as the a and b for calculating the offsets and going through the same process only in the final step subtracting rather than adding the offset.

Other embodiments could arrange the key in a circular list and just send a randomly-generated index that specifies where in the circular list to gather the cryptographic pad to use for a particular message. The binary key is many times larger than a cryptographic pad needed for a SMS message so in essence the binary key holds a number of cryptographic pads. Another embodiment could send a number of cryptographic pads that are selectable by the index. Each SMS message will use these cryptographic pads in an unpredictable way as specified by the index.

Figure 1:
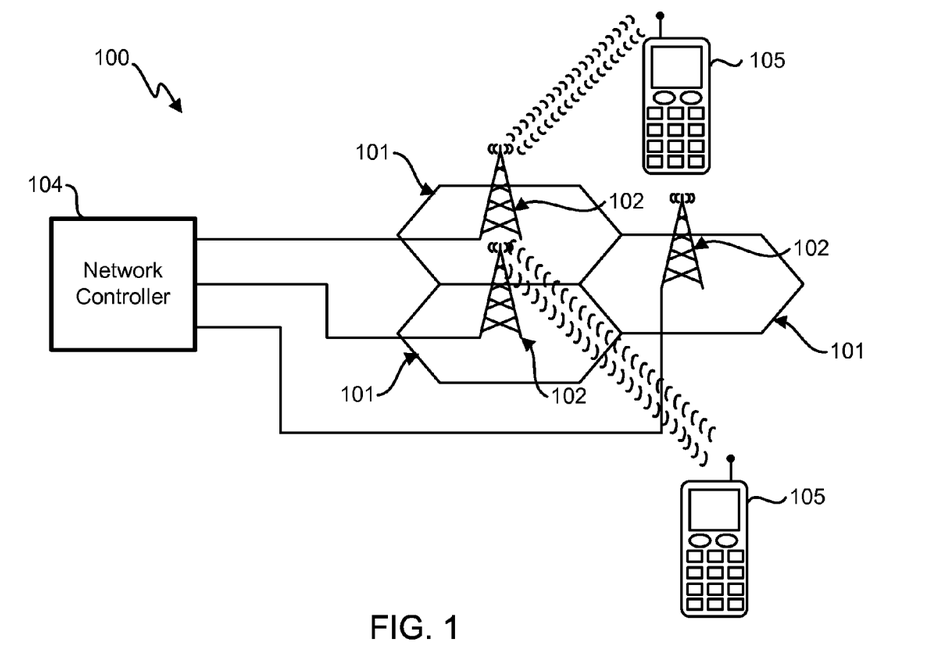
FIG. 1 depicts a block diagram of an embodiment of a wireless phone system.

Referring initially to FIG. 1, a block diagram of an embodiment of a wireless phone system 100 is shown. A network controller 104 is communicatively coupled to a number of base stations 102. The base stations 102 are each in a cell 101 that geographically cover an area with cellular phone service. Handsets 105 move through the cells 101 communicating with the base station in that cell 101 to allow a phone call, SMS messaging and data communication with the network controller 104. The network controller is in communication with the Internet, SMS networks and other phone systems. SMS messaging is used in this embodiment to send command and control information to and from the handset. Sending command and control information in the clear would pose security risks.

The air interface in a wireless phone system 100 can be used to protect all communication or subsets of the communication. In some cases, this cryptographic protection has been compromised. Embodiments layer on top of the air interface cryptographic protection providing a per message/communication protection. Additionally, some may want greater protection of certain messaging. There could even be multiple levels of cryptographic protection. For example, some messages could use a particular index only once to limit a cryptographic pad to a single use, which is virtually uncrackable. A lesser amount of protection is available when using an index and cryptographic pad multiple times. The level of protection could be scaled from strong to weak, by the number of times a cryptographic pad can be reused.

Figure 2:
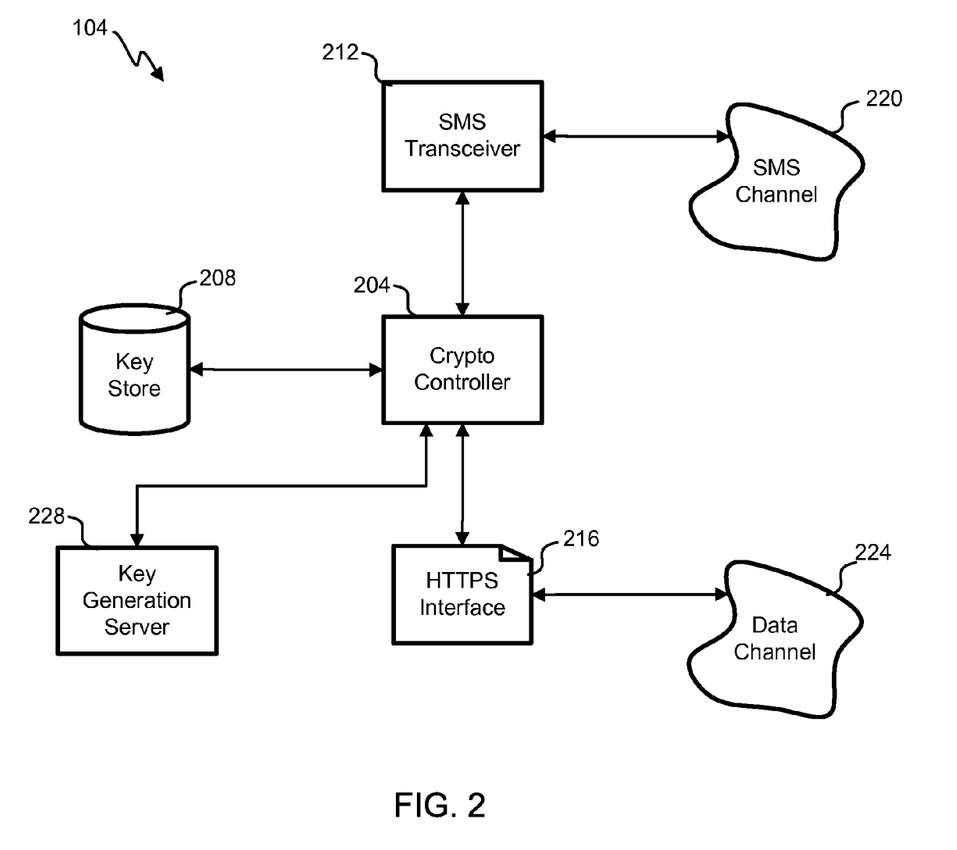
FIG. 2 depicts a block diagram of an embodiment of a network controller.

With reference to FIG. 2, a block diagram of an embodiment of portions of a network controller 104 that cryptographically protect SMS messages is shown. A key generation server 228 produces keys for each handset 105. The keys are 256 bytes in this embodiment and larger than any SMS message. In this way, each key can be considered to have multiple cryptographic pads. The keys are held in a key store 208 and referenced by some unique identifier for the handsets 105 such as Mobile Equipment Identifier (MEID), Electronic Serial Number (ESN) or International Mobile Equipment Identity (IMEI).

A handset 105 is provisioned with a key before reaching the customer. The key could alternatively be created when the customer activates the handset 105. Periodically, the key could be exchanged with a new key. If the crypto controller 204 determines that messages are not being decrypted properly at the handset 105 or if messages from the handset 105 are indecipherable, a new key will be formulated. A new key is produced by the key generation server 228 randomly. The handset 105 is given a HTTPS link to request over the data channel 224. The new key is delivered to the handset 105 through the HTTPS interface 216.

The crypto controller 204 manages key creation, key delivery and message cryptofunctions. Command/control messages use the SMS channel 220 and SMS protocol. The crypto controller 204 sends and receives SMS messages using the SMS transceiver 212. In this embodiment, the MEID is used to retrieve the key for a particular handset from the key store 208. The crypto controller 204 uses the crypto algorithm along with the key and an index to decrypt or encrypt the SMS message. The sender of the message randomly generates the index value to indicate where in the key to find the cryptographic pad being used for the particular message.

Although this embodiment uses cryptography to protect SMS messages, it is to be understood that there are other uses for the technology. E-mail, tweets, status updates, location information, social network updates, or any other messages communicated with handsets 105 could be protected cryptographically. Where there are multiple cryptographic pads and a selection on a per message or communication basis, this algorithm provides strong protection of that communication.

Figure 3:
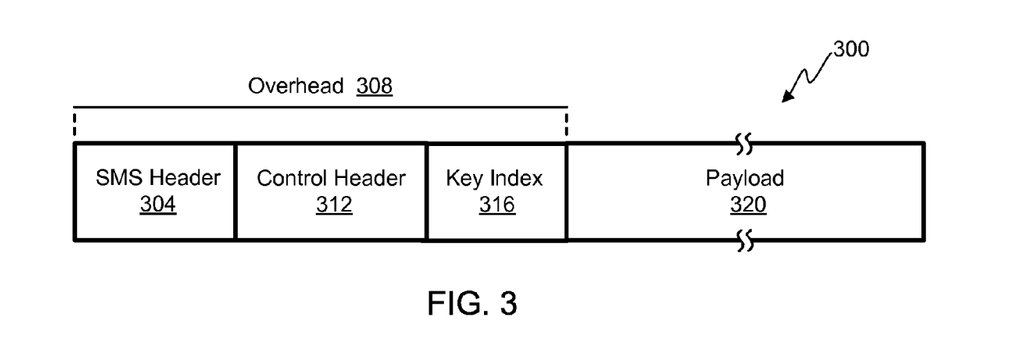
FIG. 3 depicts a diagram of an embodiment of a protected short message service (SMS) message.

Referring next to FIG. 3, a diagram of an embodiment of a cryptographically-protected SMS message 300 is shown. The SMS message 300 is broadly bifurcated into overhead 308 and payload 320. The payload 320 is the useful information that can be delivered across the wireless data link. The payload 320 could include command/control information or user information. The payload could include 8-bit characters or 7-bit characters. The characters could be defined by any number of different character sets and/or restrictions of the SMS protocol.

The overhead 308 in this embodiment includes the SMS header 304, which is the header information defined by the SMS protocol. The control header 312 could be a BREW® directed SMS header, but not necessarily so. The control header 312 indicates that the SMS message is encrypted or not. It could be one bit or byte in various embodiments. The key index 316 holds the value used to determine which cryptographic pad to use. In one embodiment, the index is an offset that is used to determine the characters to use from the key when arranged in a circular buffer. In this embodiment, the key index field holds two bytes used as the index.

The payload 320 in plaintext form is represented in a XML or binary data structure. Where a given data structure cannot be contained in a single message, the control header 312 can be used to denote which part of a multipart message was received. If one SMS message of the multipart data structure is lost, it can be requested before reconstituting the entire data structure. The SMS header 304 includes the senders phone number or 5 digit source identifier. Control/command messages originate from a known source so if the phone number or 5 digit source identifier doesn't match what is expected, the command/control information is ignored.

Figure 4:
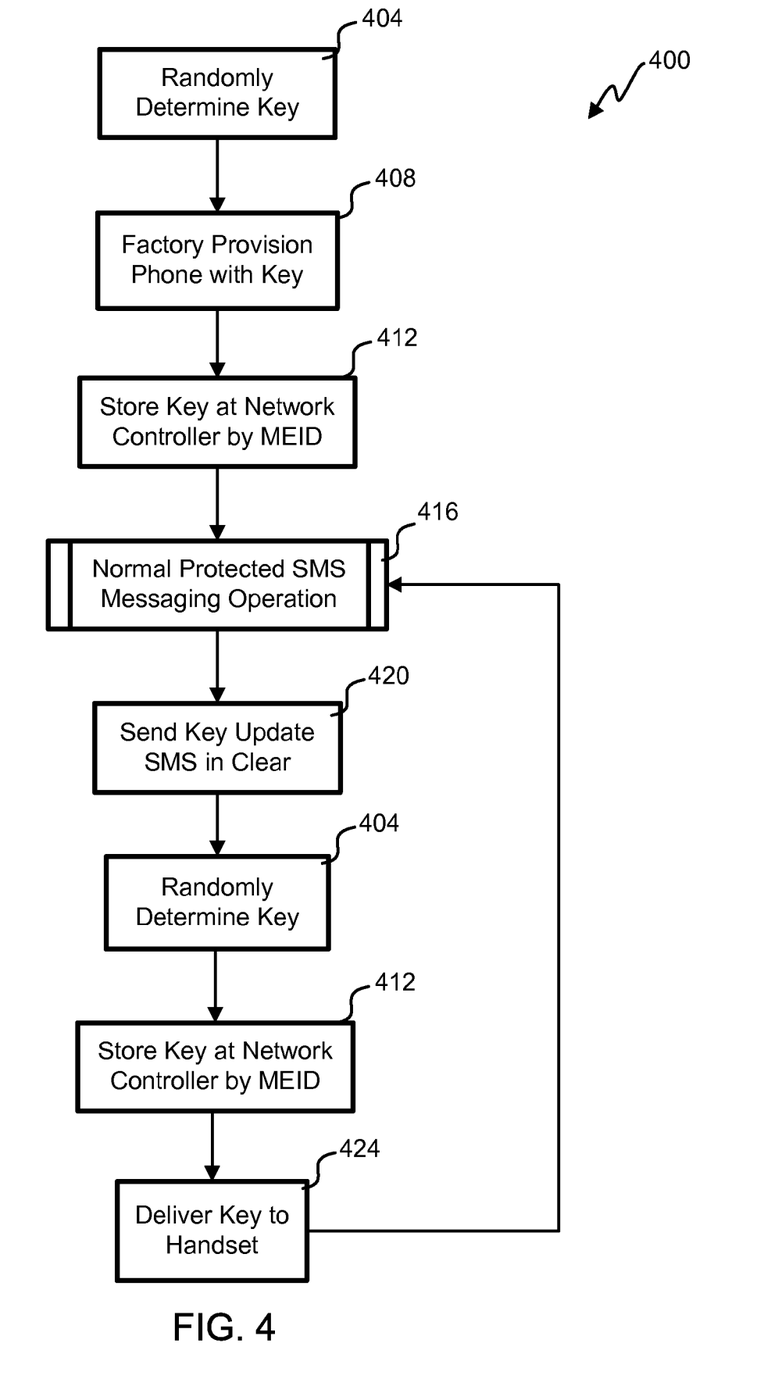
FIG. 4 illustrates a flowchart of an embodiment of a process for provisioning and re-provisioning a handset.

With reference to FIG. 4, a flowchart of an embodiment of a process 400 for provisioning and re-provisioning a handset 105 is shown. The depicted portion of the process begins in step 404 where the key generation server 228 determines a key for a particular handset 105. The key is associated with a unique identifier for the handset in this embodiment, but other embodiments could share a key among a group or all handsets 105. The key is loaded into the handset 105 at the factory or upon customer activation in block 408. The crypto controller 204 writes the key to the key store 208 in block 412. In block 416, normal operation begins with some or all SMS messages being protected with the crypto algorithm.

At some point, a new key may be needed. The key could expire, be compromised, be corrupted or hacked to precipitate changing the key. On occasion, a test message could be sent to the handset 105 in encrypted form triggering a response. In some embodiments, the response would include a code sent in the query such that its absence in the response would show an error at the handset 105. If the crypto-processing is compromised on the handset 105, the response would presumably not occur or be improper.

The crypto controller 204 would send a SMS message without encryption telling the handset 105 to initiate a secure connection to retrieve a new key in block 420. In this embodiment, a HTTPS universal resource locator (URL) link is sent to the handset 105. In block 404, a new key is randomly generated for the handset 105 and stored by MEID in block 412. The handset 105 requests the URL over a secure connection, which is delivered in block 424. With a new key, normal operation begins again in block 416.

Figure 5:
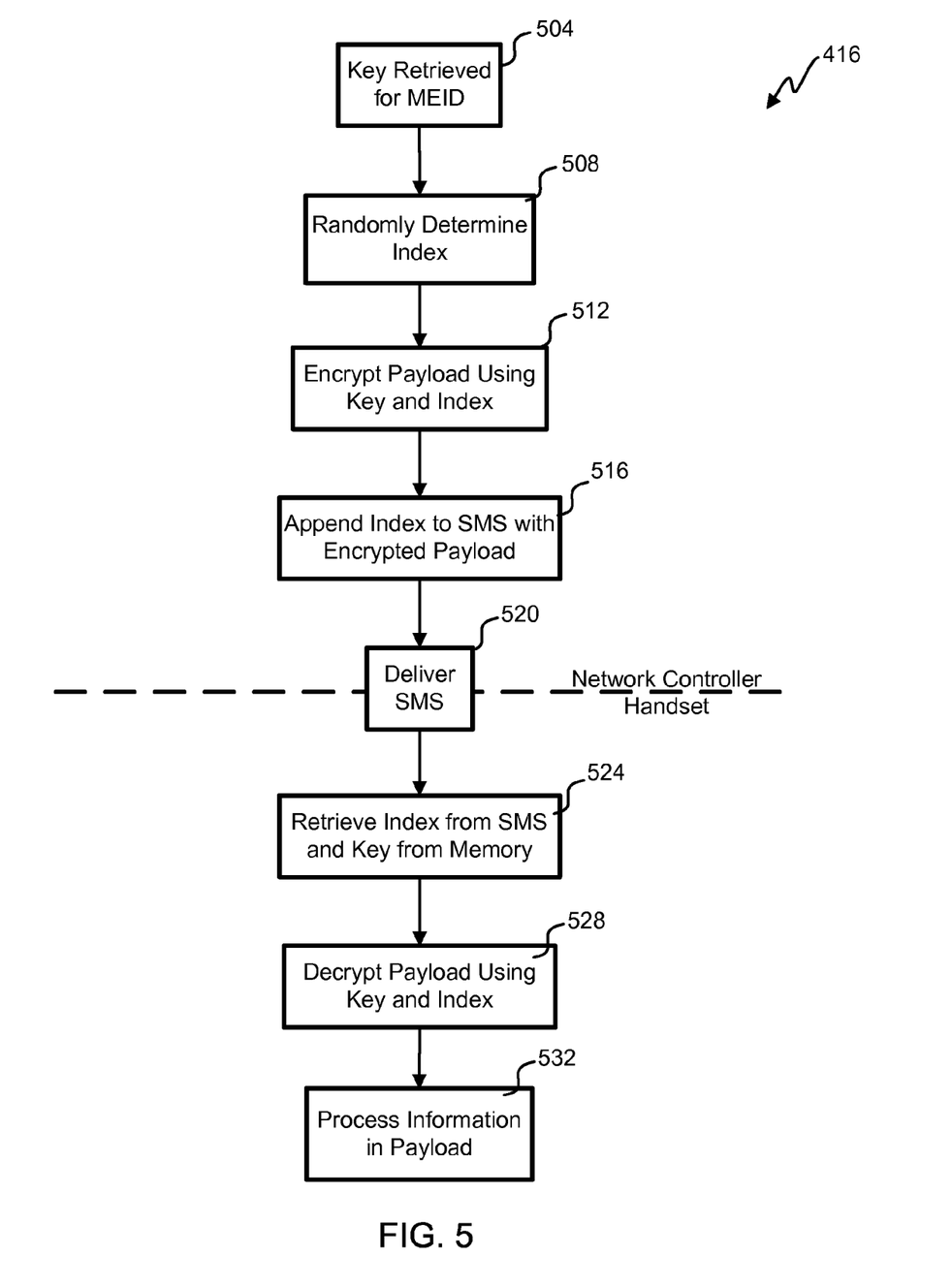
FIG. 5 illustrates a flowchart of an embodiment of a process for sending and receiving cryptographically protected messages over a wireless phone system.

Referring next to FIG. 5, a flowchart of an embodiment of a process 416 for sending and receiving cryptographically protected messages is shown. The depicted process 416 shows the network controller 104 sending a message to a selected handset 105, but it is to be understood that the handset 105 can send a message to the network controller using its key and selecting its own index. The depicted portion of the process begins in block 504 when a message that is to be cryptographically protected is received by the network controller 104. The MEID for the handset is used to retrieve the proper key by querying the key store 208.

In block 508, the index is randomly determined. The index defines which characters from the key will comprise the cryptographic pad for a given message. The crypto controller 204 replaces all the payload characters with encrypted characters using the crypto algorithm and cryptographic pad in block 512. The index is placed in the key index field 316 of the message along with modifying any bit(s) in the control header 312 to signal that the message has an encrypted payload in block 516. The SMS message is delivered over the SMS channel 220 wirelessly in block 520. For command/control messages, the handset 105 only accepts them when sent from a particular sender indicated by a phone number or 5 digit code. A command/control message from another number would fail authentication and not be processed.

In block 524, the handset 105 retrieves the index from the SMS message and retrieves the key from memory. The payload is decrypted with the stream cipher algorithm with the cryptographic pad gathered from the key using the index in block 528. The information in the payload of the message is processed in block 532. For command or control messages, the payload is contained in an XML format. Where the XML datastructure cannot be contained in a single message, it is sent using a number of messages and reformulated by the handset 105. Other embodiments could use a binary format for the payload rather than XML.

While the principles of the disclosure have been described above in connection with specific apparatuses and methods, it is to be clearly understood that this description is made only by way of example and not as limitation on the scope of the disclosure.

What is claimed is:

1. A cellular telephone encryption system for protecting messages for a handset, the cellular telephone encryption system comprising:

a key that is larger than the messages;

an index indicating a reference point for a cryptographic pad, wherein the cryptographic pad is a subset of the key and is pulled from a set of pseudorandom locations in the key, and wherein the pseudorandom locations are selected for each message to insure that the entire length of the key is utilized for each message;

a cryptographic algorithm that cryptographically processes a message as a function of the cryptographic pad; and a wireless transceiver that sends or receives the message;

wherein the cryptographic algorithm takes a character from a payload of the message and replaces it with a different character selected from a predefined character set that is different from the character set from which the key is constructed.

2. The cellular telephone encryption system for protecting messages for the handset as recited in claim 1, wherein the index is embedded into the message.

3. The cellular telephone encryption system for protecting messages for the handset as recited in claim 1, wherein the message is a short message service (SMS) message.

4. The cellular telephone encryption system for protecting messages for the handset as recited in claim 1, wherein the wireless transceiver is in the handset and sends the message.

5. The cellular telephone encryption system for protecting messages for the handset as recited in claim 1, wherein the cryptographic pad is pulled from the key using non-sequential information.

6. The cellular telephone encryption system for protecting messages for a handset as recited in claim 1, wherein the key is used to process multiple messages, a respective cryptographic pad being pulled from a respective set of pseudorandom locations within the key for each message to be processed.

7. The cellular telephone encryption system for protecting messages for the handset as recited in claim 1, wherein the predefined character set has fewer members than the number of possible unique values in the key.

8. The cellular telephone encryption system for protecting messages for the handset as recited in claim 1, wherein the predefined character set consists of printable characters.

9. The cellular telephone encryption system for protecting messages for the handset as recited in claim 1, wherein the replacement character is selected from the predefined character set at least in part by indexing into a circular list of the characters in the predefined character set using a value from the key as the index into the circular list.

10. A method for cryptographically processing short message service (SMS) messages of a handset, the method comprising:

loading a key into a memory, wherein the key is larger than the messages;

determining an index within the key;

determining a replacement character that is a function of a cryptographic pad located by the index, wherein during processing of a particular SMS message, the cryptographic pad is pulled from a set of pseudorandom locations in the key, the pseudorandom locations selected for each message such that the entire length of the key is utilized for each message, and wherein the replacement character is selected from a predefined character set that is different from the character set from which the key is constructed; and replacing a character in the payload of the SMS message with the replacement character.

11. The method for cryptographically processing SMS messages of the handset as recited in claim 10, further comprising receiving the key from a wireless network.

12. The method for cryptographically processing SMS messages of the handset as recited in claim 10, wherein the index is a function of a value in a payload for the SMS message.

13. The method for cryptographically processing SMS messages of the handset as recited in claim 10, wherein a stream cipher is used for encryption of the SMS.

14. The method for cryptographically processing SMS messages of the handset as recited in claim 10, wherein the key is randomly generated.

15. The method for cryptographically processing SMS messages of the handset as recited in claim 10, wherein the key is binary.

16. The method for cryptographically processing SMS messages of the handset as recited in claim 10, further comprising:

detecting tampering with a handset holding the key; and making the key unreadable.

17. The method for cryptographically processing SMS messages of the handset as recited in claim 10, wherein the key is known to both a server and a handset communicating the SMS message.

18. The method for cryptographically processing SMS messages of the handset as recited in claim 10, wherein the predefined character set is a 7 bit SMS character set.

19. The method for cryptographically processing short message service (SMS) messages of a handset as recited in claim 10, wherein the key is used to process multiple SMS messages, a respective cryptographic pad being pulled from a respective set of pseudorandom locations within the key for each SMS message to be processed.

20. The method for cryptographically processing SMS messages of the handset as recited in claim 10, wherein the predefined character set has fewer members than the number possible unique values in the key.

21. The method for cryptographically processing SMS messages of the handset as recited in claim 10, wherein the predefined character set consists of printable characters.

22. The method for cryptographically processing SMS messages of the handset as recited in claim 10, wherein the replacement character is selected from the predefined character set at least in part by indexing into a circular list of the characters in the predefined character set using a value from the key as the index into the circular list.

23. A method for cryptographically processing short message service (SMS) messages of a handset, the method comprising:

providing a value that identifies a cryptographic pad, from a plurality of cryptographic pads within a key that is larger than the SMS messages and that is stored in a memory, to use to cryptographically process a SMS message;

loading the identified cryptographic pad from a set of pseudorandom locations in the key, the pseudorandom locations selected for each SMS message such that the entire length of the key is utilized for each SMS message;

determining a replacement character that is a function of the cryptographic pad identified by the value, wherein the replacement character is selected from a predefined character set that is different from the character set from which the key is constructed; and replacing a character in the payload of the SMS message with the replacement character.

24. The method for cryptographically processing SMS messages of the handset as recited in claim 23, wherein the value is stored in the SMS message.

25. The method for cryptographically processing SMS messages of the handset as recited in claim 23, wherein the SMS message is decrypted by successively replacing characters in the SMS message using the cryptographic pad.

26. The method for cryptographically processing SMS messages of the handset as recited in claim 23, wherein the SMS message is encrypted by successively replacing characters in the SMS message using the cryptographic pad.

27. The method for cryptographically processing SMS messages of the handset as recited in claim 23, further comprising sending the SMS message from a handset over a wireless network.

28. The method for cryptographically processing short message service (SMS) messages of a handset as recited in claim 23, wherein the key is used to process multiple SMS messages, a respective cryptographic pad being pulled from a respective set of pseudorandom locations within the key for each SMS message to be processed.

29. The method for cryptographically processing SMS messages of the handset as recited in claim 23, wherein the predefined character set has fewer members than the number possible unique values in the key.

30. The method for cryptographically processing SMS messages of the handset as recited in claim 23, wherein the predefined character set consists of printable characters.

31. The method for cryptographically processing SMS messages of the handset as recited in claim 23, wherein the replacement character is selected from the predefined character set at least in part by indexing into a circular list of the characters in the predefined character set using a value from the key as the index into the circular list.

32. A method for cryptographically processing messages, the method comprising:
   storing a key into a memory, wherein the key is larger than the messages;
   encrypting a first message using a first cryptographic pad that is a first subset of the key, the first cryptographic pad being pulled from a first set of pseudorandom locations in the key, the pseudorandom locations selected for each message to insure that the entire length of the key is utilized for each message; and
   encrypting a second message using a second cryptographic pad that is a second subset of the key, the second cryptographic pad being pulled from a second set of pseudorandom locations in the key;
   wherein encrypting a message comprises replacing each character of the message with a respective replacement character selected from a predefined character set that is different from the character set from which the key is constructed.

33. The method for cryptographically processing messages as recited in claim 32, wherein the locations from which each respective cryptographic pad is pulled from the key are determined at least in part based on the content of the respective message.

34. The method for cryptographically processing messages as recited in claim 33, wherein the locations from which each respective cryptographic pad is pulled from the key are determined at least in part based one or more pseudorandom characters placed in the content of the respective message for the purpose of identifying the respective cryptographic pad.

35. The method for cryptographically processing messages as recited in claim 32, wherein the locations from which the respective cryptographic pad is pulled from the key are determined at least in part based on the length of the respective message.

36. The method for cryptographically processing messages as recited in claim 32, wherein the locations from which each respective cryptographic pad is pulled from the key are determined at least in part based on the key values.

37. The method for cryptographically processing messages as recited in claim 36, wherein the locations from which each respective cryptographic pad is pulled from the key are determined using a series of hops through the key data, wherein the key value at a hop is used as input into the next hop distance.

38. The method for cryptographically processing messages as recited in claim 32, wherein the predefined character set has fewer members than the number possible unique values in the key.

39. The method for cryptographically processing messages as recited in claim 32, wherein the predefined character set consists of printable characters.

40. The method for cryptographically processing messages as recited in claim 32, wherein the replacement character is selected from the predefined character set at least in part by indexing into a circular list of the characters in the predefined character set using a value from the key as the index into the circular list.

* * * * *